Jan. 2, 1934.  C. F. ERICKSON  1,941,935
TRACTION DEVICE
Filed April 27, 1933
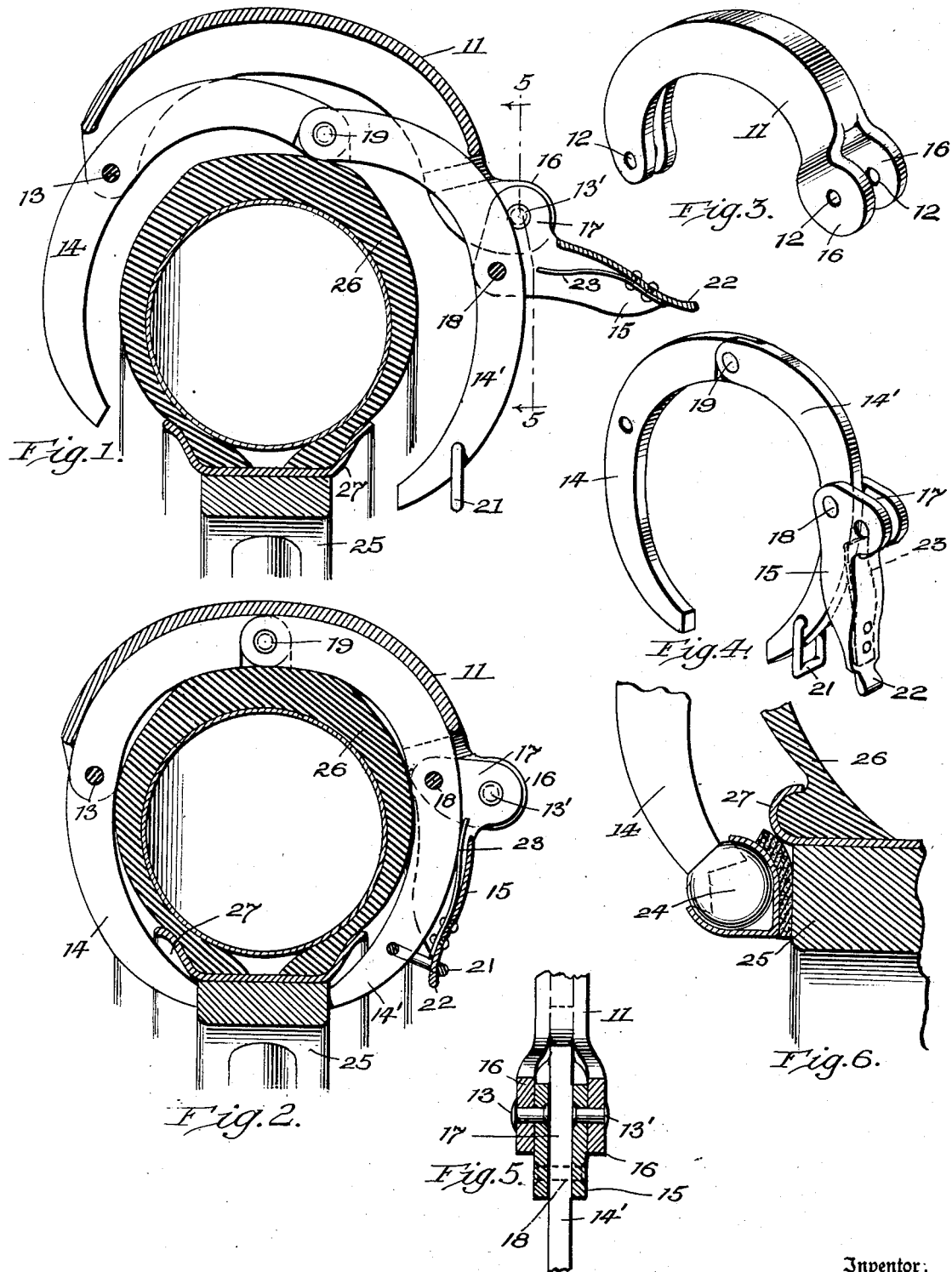
Inventor:
Christian F. Erickson
By [signature]
Attorneys Patented Jan. 2, 1934

1,941,935

UNITED STATES PATENT OFFICE 1,941,935

TRACTION DEVICE

Christian F. Erickson, Grand Forks, N. Dak.

Application April 27, 1933. Serial No. 668,260

8 Claims. (Cl. 152—14)

This invention relates to traction devices for automobile wheels, and more particularly to a novel form of that type of road grip known as mud hooks.

Prior devices designed to be attached to wheels to prevent spinning thereof when the wheels have sunk in soft mud have either been difficult to apply and remove, or they do not take a firm grip on the wheel. Furthermore, they are not always universal in the sense that they are applicable to disc wheels as well as spoked wheels. The present invention contemplates the provision of clamping jaws designed to grip the felly of the wheel, regardless of whether it is of the disc or spoked type, and novel means for drawing the clamps into engagement with the felly whereby application and removal of the traction device to the wheel are quickly and easily effected. The attachment is so constructed that the tread piece effectively protects the lighter, movable parts against obstacles and hard objects encountered in use of the device, thus insuring effective operation under the most adverse conditions.

The invention will be more fully understood from the following description thereof taken in connection with the accompanying drawing in which numerous detailed improvements are illustrated.

In the drawing:—

Fig. 1 is a front elevation, partly in section, the clamp being open and ready for application to or removal from a wheel carrying a pneumatic tire;

Fig. 2 is a view similar to Fig. 1, the clamp being closed and in engagement with the wheel felly;

Fig. 3 is a perspective view of the arch or traction member;

Fig. 4 is a perspective view of the clamping mechanism;

Fig. 5 is a section taken on line 5—5 of Fig. 1; and

Fig. 6 is a partial sectional view of a modified grip for attachment to the clamp.

The traction element 11 is a relatively heavy, arched cleat member, U-shaped in cross section and having apertures 12 at the ends of the flanges thereof to accommodate pins 13, 13' on which clamping jaw 14 and locking lever 15 are fulcrumed. The edges of the flanges are curved to lie snugly against a tire, the corners thereof being rounded off to prevent injury to the tire. The flanges at one end of the cleat are shaped to form ears 16 and are spread apart a distance sufficient to accommodate the bifurcated end 17 of the locking lever, the latter being pivoted to jaw 14' by means of pin 18. The jaws are each reduced at their inner ends and are pivoted to each other at 19, the reduced portions of the jaws overlapping each other adjacent the pivot. Lever 15 is, in effect, a bell crank lever. As shown in the drawing the jaws 14, 14' are of similar shape and length and their pivotal connections with the cleat and locking lever are intermediate the ends of the respective jaws.

When the lever is swung outwardly about pin 13', the clamping jaws are opened and, conversely, they are closed when the lever is moved toward jaw 14'. The bell crank lever is channel-shaped so that the side flanges thereof lie contiguous to the jaw, thus permitting the lever to lie substantially flush with the jaw when the traction device has been applied to the wheel.

Pivotally secured to jaw 14' is a link 21 adapted to engage the reduced end 22 of lever 15 when the latter is moved inwardly to close the jaws. Riveted or otherwise secured to lever 15 is a leaf spring 23, the free end of which bears against jaw 14' when the cleat is clamped to the wheel. This spring tends to move the end of lever 15 away from the clamp jaw and in so doing insures engagement of the lever end with link 21. Thus, the lever is effectively held in its locking position and accidental displacement thereof is prevented.

In the embodiment of the invention illustrated in Figs. 1, 2, and 4, the ends of the clamping jaws are squared. For most purposes this form of jaw will suffice, but, where it is desired to prevent marring of paint, the modified construction shown in Fig. 6 may be utilized. In this form of clamp, each of the jaws is provided with a spherical end 24 over which a metallic socket member is pressed to form a swivel connection therewith. One side of the socket piece is preferably flattened and to this side there is secured a pad of felt or other suitable material forming a relatively soft, resilient friction surface which bears against the wheel felly 25 when the device is applied to the wheel.

It is to be noted that the channel-shaped cleat and the clamp jaws are arcuate so that, when the mud hook is attached to the wheel, the jaws nest within the flanges of the cleat and conform substantially to the contour of the tire 26. With this arrangement it is obvious that the clamping jaws are protected against hard objects. The lower ends of the jaws clear the rim 27 and engage the felly effectively to hold the device firmly on the wheel. Since the jaws are contiguous to the tire and extend under the rim to bear against the felly, it is apparent that creeping with respect to the tire is inhibited.

From the foregoing description the manner in which the mud hook is applied and used will be obvious. The device is opened as shown in Fig. 1 to apply the same to a wheel. Lever 15 is then swung inwardly and the jaws brought together to engage the wheel felly. The lever is then locked in the position shown in Fig. 2 by slipping link 21 over the end of the lever. It is to be noted, however, that lever 15 and jaw 14' form a toggle linkage and that pin 18 moves past a horizontal line passing through pin 13', thus locking the bell crank lever with relation to jaw 14'. As a further safeguard against accidental detachment, it is desirable that the link 21 be employed.

While several preferred embodiments of the invention have been described, it is intended that the size and shape of the clamp jaws be made to conform with various size tires, as well as with the several types of rim in use. The scope of the appended claims is, therefore, not to be limited to the precise arrangement of parts illustrated and described herein.

What is claimed is:—

1. A traction device for a wheel comprising a cleat; a pair of clamping jaws pivoted to each other; and a locking lever, said lever being pivotally connected to said cleat and to one of said jaws, the other of said jaws being pivoted to said cleat.

2. A traction device for a wheel comprising a cleat; a pair of arcuate clamping jaws pivoted to each other at their ends; and a locking lever, said lever being pivotally connected to said cleat and to one of said jaws intermediate the ends of the jaw, the other of said jaws being pivoted intermediate its ends to said cleat.

3. A traction device for a wheel comprising an arched cleat, said cleat being U-shaped in cross section; a pair of arcuate jaws pivoted to each other and adapted to nest within the flanges of said cleat; and a locking lever, said lever being pivotally connected to one end of said cleat and to one of said jaws, the other of said jaws being pivoted to the other end of said cleat.

4. A traction device for a wheel comprising an arched cleat; a pair of similar clamping jaws pivoted at their ends to each other; and a locking lever, said lever being pivotally connected to one end of said cleat and to one of said jaws intermediate the ends of said jaw, the other of said jaws being pivoted intermediate its ends to the other end of said cleat.

5. A traction device for a wheel comprising an arched cleat; a pair of clamping jaws pivoted to each other; and a bell crank lever, said lever being fulcrumed to one end of said cleat and having one of its arms pivotally connected to one of said jaws, the other of said jaws being pivoted to the other end of said cleat.

6. A traction device for a wheel comprising an arched cleat; a pair of clamping jaws pivoted to each other; a locking lever, said lever being pivotally connected to said cleat and to one of said jaws, the other of said jaws being pivoted to said cleat; and means on said first-mentioned jaw for maintaining said lever in locking position when said jaws are moved to clamping relation with the wheel.

7. A traction device for a wheel comprising an arched cleat; a pair of clamping jaws pivoted to each other; a locking lever, said lever being pivotally connected to said cleat and to one of said jaws, the other of said jaws being pivoted to said cleat; means on said first mentioned jaw for engaging said lever to hold the lever in locking position when said jaws are moved to clamping relation with the wheel; and means for maintaining engagement of the engaging means and the lever.

8. A traction device for a wheel comprising an arched cleat; a pair of clamping jaws pivoted to each other; a locking lever, said lever being pivotally connected to said cleat and to one of said jaws, the other of said jaws being pivoted to said cleat; a socket member swiveled to the free end of each of said jaws; and a resilient element on each of said socket members, said element bearing against said wheel when said jaws are moved to clamping relation with the wheel.

CHRISTIAN F. ERICKSON.